(12) United States Patent
Baldwin et al.

(10) Patent No.: US 6,196,189 B1
(45) Date of Patent: Mar. 6, 2001

(54) METHOD AND APPARATUS FOR CONTROLLING THE SPEED OF AN ENGINE

(75) Inventors: Darryl D. Baldwin, Lacon; James B. Maddock, Washington; Fred Mehdian, Peoria; Anthony E. Sloan, Lacon, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/336,343

(22) Filed: Jun. 18, 1999

(51) Int. Cl.$^7$ .............................. F02D 11/10; F02D 41/14
(52) U.S. Cl. ............................................ 123/352; 123/361
(58) Field of Search ................................... 123/352–355, 123/360, 361, 399

(56) References Cited

U.S. PATENT DOCUMENTS

| | | | |
|---|---|---|---|
| 4,520,779 | * | 6/1985 | Kubach ............................. 123/352 X |
| 4,577,718 | * | 3/1986 | Ueno ................................. 123/352 X |
| 4,603,668 | * | 8/1986 | Ueno ..................................... 123/352 |
| 4,707,792 | * | 11/1987 | Naitou ............................... 123/399 X |
| 4,791,902 | * | 12/1988 | Ishikawa et al. ................. 123/361 X |
| 4,884,541 | * | 12/1989 | Marriott ............................ 123/352 X |
| 5,137,001 | | 8/1992 | Taniguchi ............................. 123/494 |
| 5,313,798 | | 5/1994 | Yoshioka et al. ...................... 60/600 |
| 5,329,455 | * | 7/1994 | Oo et al. .......................... 123/352 X |
| 5,351,486 | | 10/1994 | Yoshioka et al. ...................... 60/612 |
| 5,662,085 | * | 9/1997 | Aubourg et al. ....................... 123/352 |
| 5,724,813 | | 3/1998 | Fenelon et al. ........................ 60/606 |
| 5,816,047 | | 10/1998 | Zurlo ..................................... 60/602 |
| 6,021,755 | * | 2/2000 | Maddock et al. .................... 123/361 |

* cited by examiner

*Primary Examiner*—Tony M. Argenbright
(74) *Attorney, Agent, or Firm*—W. Bryan McPherson, III

(57) ABSTRACT

The present invention provides a method and apparatus for controlling the speed of an engine. The engine has an associated turbo charger and a throttle. The method includes the steps of determining an actual speed of the engine, establishing a desired speed of the engine, determining an overspeed condition exists in response to said desired speed and said actual speed, and determining a throttle command in response to the desired and actual engine speed.

19 Claims, 4 Drawing Sheets

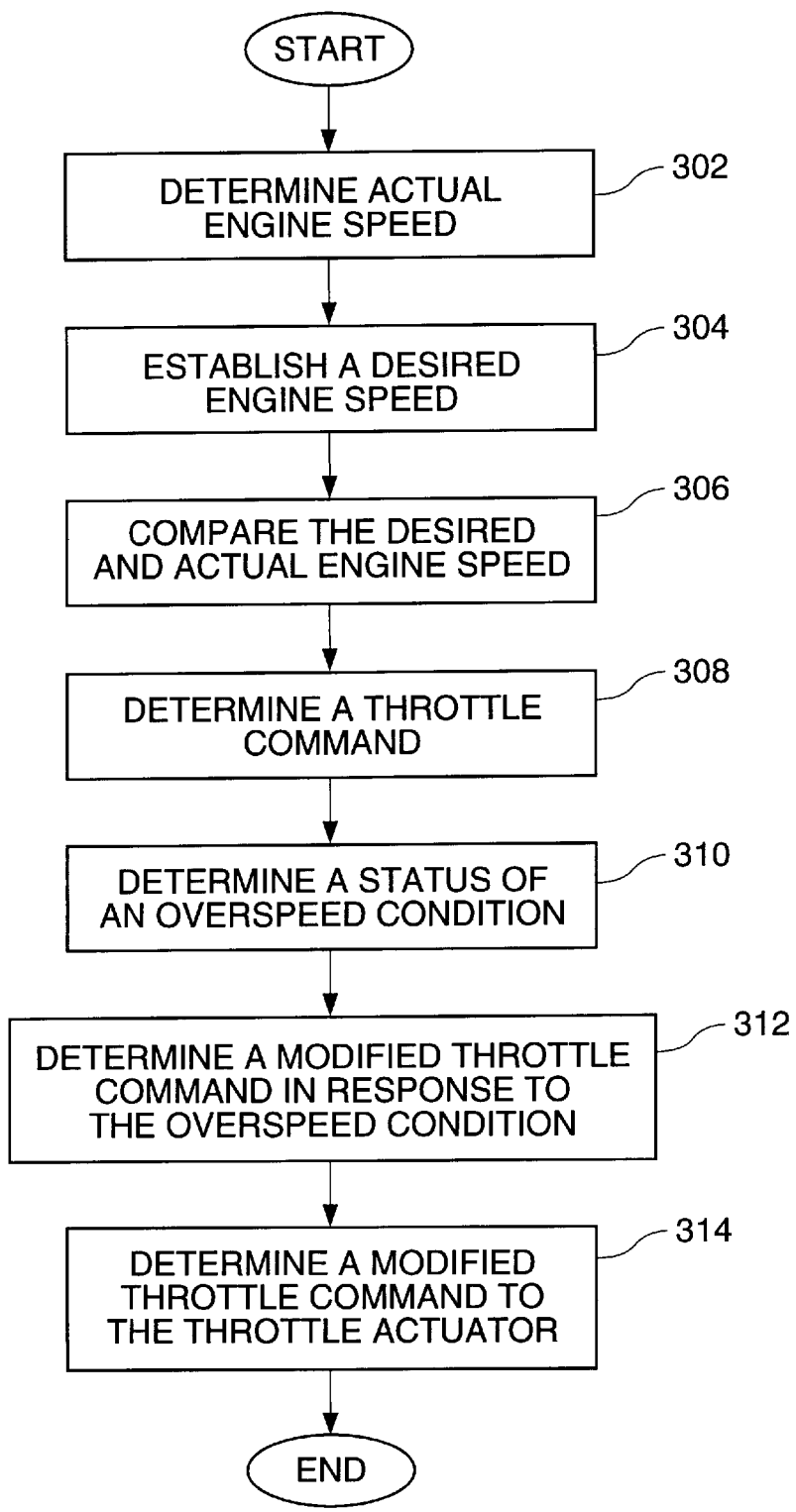

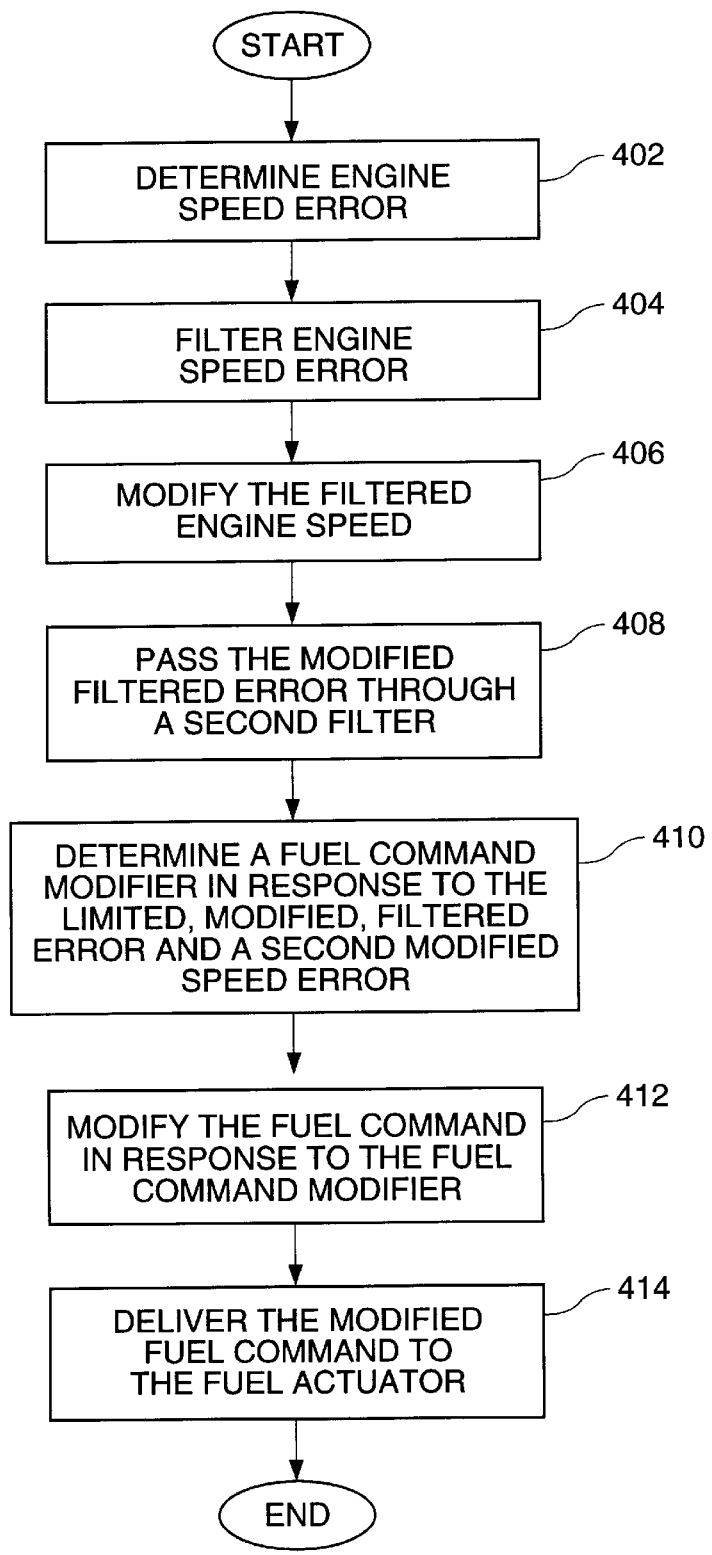

METHOD AND APPARATUS FOR CONTROLLING THE SPEED OF AN ENGINE

TECHNICAL FIELD

This invention relates generally to an engine, and more particularly, to a method and apparatus for controlling the speed of an engine.

BACKGROUND ART

Electronic control of fuel systems on an engine generally provide a determined amount of fuel to the engine in response to a desired and an actual engine speed. In one embodiment, the engine may have an associated turbocharger. When the load on the engine is quickly removed, an engine overspeed or turbo surge may result. That is, when the load is removed suddenly from the engine, the engine may rapidly accelerate above the desired engine speed. The speed of the engine and the turbocharger may begin to surge uncontrollably. Current fuel control systems may be unable to stabilize the engine speed, in part, because of the sudden and significant difference between the desired and actual engine speed.

The present invention is directed to overcoming one or more of the problems identified above.

DISCLOSURE OF THE INVENTION

In one aspect of the present invention, a method for controlling the speed of an engine is disclosed. The engine has an associated turbocharger and a throttle. The method includes the steps of determining an actual speed of the engine, establishing a desired speed of the engine, determining an overspeed condition exists in response to the desired speed and the actual speed, and determining a throttle command in response to said desired speed, said actual speed.

In another aspect of the present invention, an apparatus adapted to control the speed of an engine is disclosed. The apparatus includes, a speed sensor adapted to sense an actual speed of the engine and responsively generate an actual speed signal, and a controller adapted to receive the actual speed signal, establish a desired speed, determine a status of an overspeed condition in response to said desired speed and said actual speed, and determine a throttle command in response to the desired speed, and the actual speed and the overspeed condition.

BRIEF DESCRIPTION OF THE DRAWINGS

FIG. 3 is an illustration of a method for controlling the speed of the engine; and FIG. 4 is an illustration of a method for modifying a fuel command in response to an overspeed condition.

BEST MODE FOR CARRYING OUT THE INVENTION

Figure 1:
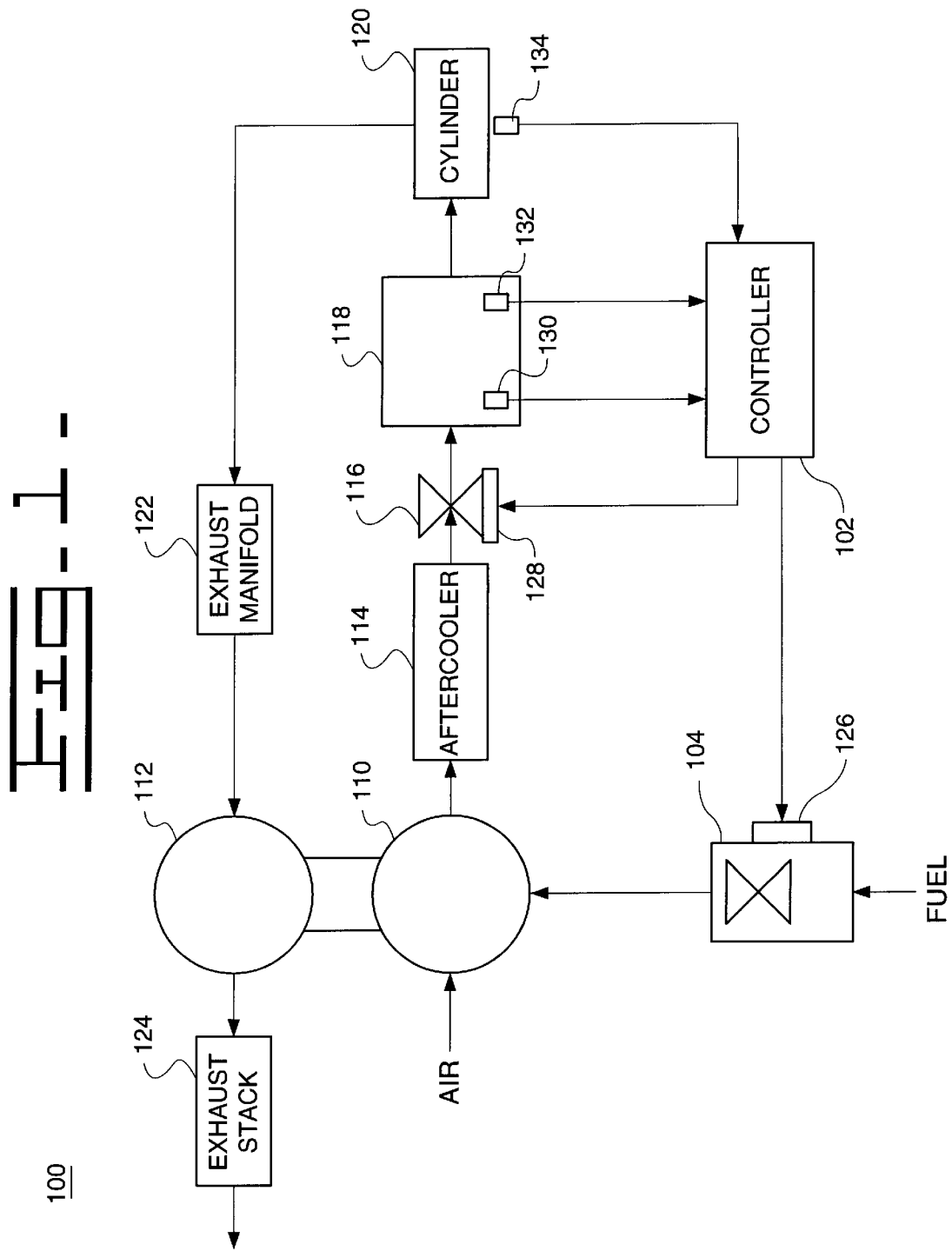
FIG. 1 is a high level diagram of one embodiment of a fuel system.

The present invention provides a method and apparatus for controlling the speed of an engine. In the preferred embodiment, the engine has an associated turbocharger and a throttle. FIG. 1 is an illustration of one embodiment of a fuel system 100. A fuel control valve 104, such as a Tecjet, enables fuel to flow to a compressor 110. The resulting air/fuel mixture passes through an aftercooler 114. A throttle 116 controls the volume of air/fuel mixture that flows into an intake manifold 118. The manifold 118 delivers the fuel to one or more cylinders 120. FIG. 1 illustrates one cylinder 120 for exemplary reasons, however it is known in the art to deliver fuel from the manifold 118 to multiple cylinders 120. The exhaust from the cylinders 120 passes through the exhaust manifold 122, the turbine 112, and the exhaust stack 124.

A controller 102 may receive inputs from a pressure sensor 130, located in the intake manifold 118, a temperature sensor 132, located in the intake manifold 118, and an actual speed sensor 134. The fuel system 100 includes a value representative of a desired engine speed in the controller 102. The desired engine speed value may be predetermined, or dynamically determined. The controller 102 may receive continuous updates from the sensors. The controller 102 responsively determines a throttle position and a fuel control valve position, and sends the appropriate throttle commands to a throttle actuator 128, and a fuel actuator 126 respectively. The throttle actuator 128 will control the position of the throttle 116 in response to the throttle command. The fuel valve actuator 126 will control the position of the fuel control valve 104 in response to the fuel command.

The actual engine speed sensor 134 is electrically connected to the controller 102. The speed sensor 134 can be any type of sensor that accurately produces an electrical signal in response to the engine crankshaft speed. For example, in one embodiment, the speed sensor 134 is mounted on an engine flywheel housing (not shown) and produces a digital speed signal in response to the speed of the flywheel mounted on an engine crankshaft (not shown).

A pressure sensor 130 may be disposed in the intake manifold 118 and is electrically connected to the controller 102. The pressure sensor 130 produces a pressure signal in response to the actual absolute pressure in the intake manifold 118.

A manifold temperature sensor 132 may be disposed in the intake manifold 118, and is electronically connected to the controller 102. The temperature sensor 132 produces a temperature signal in response to the temperature in the air intake manifold 118.

Figure 2:
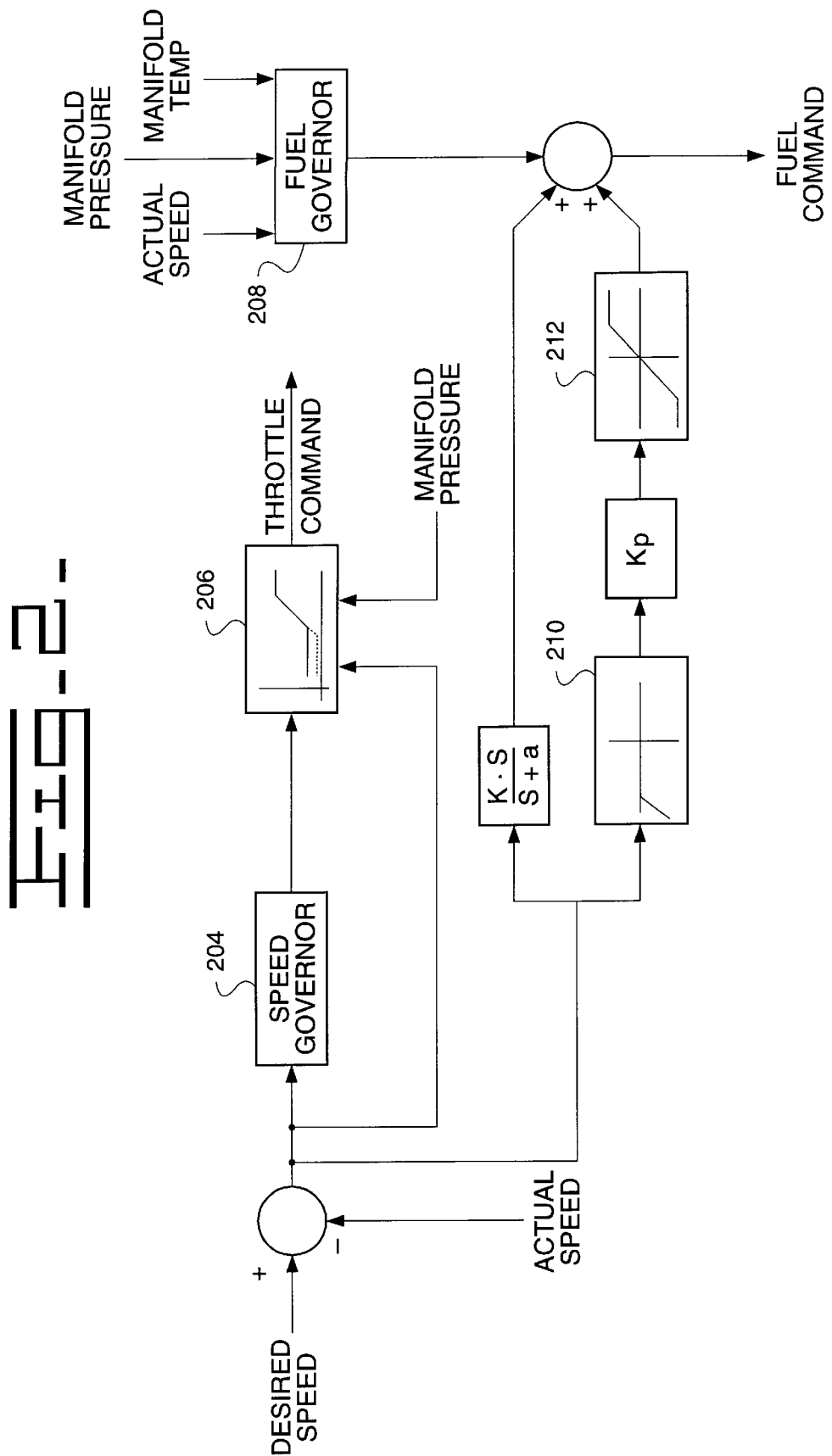
FIG. 2 is a functional block diagram of a system adapted to control the speed of an engine.

FIG. 2 illustrates one embodiment of a functional block diagram of the present invention. The functional block diagram may be implemented in software and executed on the controller 102. FIG. 3 illustrates one embodiment of the method of the present invention. The present invention includes a method for controlling the speed of an engine, including the steps of determining an actual engine speed, establishing a desired engine speed, determining a status of an overspeed condition in response to the desired engine and actual engine speeds, and determining a throttle command in response to the desired speed, actual speed, and the overspeed condition status.

In a first control block 302, an actual engine speed is determined. The controller 102 receives an actual speed signal from the actual speed sensor 134 and responsively determines the actual speed of the engine. In a second control block 304, a desired engine speed is established. The desired engine speed may be dynamically established in response to receiving a desired engine speed signal which may be representative of an input throttle command, from an operator for example, or by a cruise control system (not shown). Alternatively, the desired engine speed may be a predetermined value. In a third control block 306 a comparison is made between the actual and desired engine speed. In the preferred embodiment, an engine speed error is determined in response to the difference between the desired and actual engine speed. In a fourth control block 308, a throttle command is determined in order to control the amount of air/fuel mixture that flows into the manifold 118. The throttle command is determined in response to a comparison of the desired and actual engine speeds. In one embodiment, the result of a comparison between the desired and actual engine speed, e.g., the engine speed error, is used to determine the throttle command. The throttle command may be determined utilizing a proportional, integral, derivative (PID) control algorithm. The PID control algorithm receives the engine speed error, and responsively determines a throttle command. PID control algorithms are well known in the art. An example of a PID control algorithm is shown below.

$$C_i = K_P e_i + K_I \sum_{j=0}^{i} e_j + K_D(e_i - e_{i-1})$$

Where $e_j$=error(desired speed−actual speed)
$C_i$=Command (Throttle) at time $t_i$
$K_P$=Proportional gain of the governor
$K_I$=Integral gain of the governor
$K_D$=Derivative gain of the governor In the preferred embodiment the PID algorithm is included within a functional speed governor 204, as illustrated in FIG. 2. The speed governor 204 receives the engine speed error and responsively determines a throttle command. Control is then passed to a fifth control block 310 to determine the status of an overspeed condition. In one embodiment, the overspeed condition either exists, or does not exist, i.e., the status is either true (the condition exists), or false. Alternatively, the overspeed condition status may be described as a variable indicative of the degree of the overspeed condition. For example 0 may indicate that no overspeed condition exists, and 10 may indicate a severe overspeed condition, and the status may vary between 0 and 10 in relation to the severity of the condition. In one embodiment, the overspeed condition is determined to exist when the difference between the desired speed and the actual speed exceeds an overspeed threshold. In the preferred embodiment, the overspeed threshold is a predetermined threshold. When the speed error exceeds the predetermined threshold, an overspeed condition may be determined to exist. In an alternative embodiment, the overspeed threshold may be dynamically determined. For example, the overspeed threshold may be 103% of the desired speed. That is, when the speed error (desired−actual speed) exceeds 3% of the value of the desired speed, an overspeed condition is determined to exist. In another embodiment, the overspeed threshold may be determined as a function of the desired speed, such that, the larger the desired speed, the larger the overspeed threshold.

Control proceeds to a sixth control block 312 to determine a throttle command in response to the overspeed condition. In the preferred embodiment, the throttle command, determined utilizing the speed governor 204, is modified in response to the overspeed condition. The throttle command of the speed governor 204 may be modified by filtering the command using a modified throttle command range. The modified command range may be determined by limiting or reducing the full throttle command range in response to the overspeed condition, thereby limiting the effective position range of the throttle. Modification of the throttle command range is described below.

The modified throttle command range is determined such that when an overspeed condition exists, the throttle position will not be commanded fully closed. Using the modified command range, the throttle command determined by the speed governor 204 is modified, or filtered, accordingly. If the overspeed condition does not exist, the throttle command range is not modified, and the throttle command determined by the speed governor 204 is essentially passed through the filter 206 unchanged.

Once the throttle command range has been modified, the throttle command determined by the speed governor 204 is modified, or filtered, accordingly. In a seventh control block 314, the modified throttle command is delivered to the throttle actuator 128. The throttle actuator 128 will then responsively control the position of the throttle 116 thereby enabling the appropriate amount of air/fuel mixture into the manifold 118.

As stated above, the throttle command range is modified in response to the overspeed condition. Under normal conditions, i.e., the overspeed condition does not exist, the throttle command range is from 0%–100% of the maximum throttle position, indicating that the throttle may be commanded from a fully closed position (0%) to a fully open position (100%) and anywhere in between. The throttle command range may be modified in response to an overspeed condition by raising the minimum throttle command position to a modified minimum throttle command position. Therefore, the minimum commanded position of the throttle, i.e., normally the closed position (0%), is increased such that the modified minimum commanded position does not result in a fully closed throttle position. The modified minimum command position may be predetermined, or dynamically determined. In the preferred embodiment, the modified minimum throttle position is a predetermined value that has been empirically determined, e.g., 45% of the maximum throttle position (or fully open position). That is, initially the throttle command range may be 0 to 100% of the fully open throttle position, but when an overspeed condition is detected, the throttle range may be limited to 45–100% of the fully open throttle position, for example. Alternatively, the modified minimum throttle position may be dynamically determined. Therefore, the modified minimum command position is determined such that when an overspeed condition exists, the throttle position is not commanded fully closed. Then, in one embodiment, when an overspeed condition exists, and a modified throttle command range has been determined, if the throttle command determined by the speed governor 204, is less than the modified minimum command of the modified range, the throttle command is modified, or limited, to the modified minimum command. For example, if the throttle command was determined such that the resulting throttle position was 0%, or fully closed, and the modified throttle command range was modified to 45–100% of the full throttle position range, then the modified throttle command would result in the throttle position being at a 45% position, the modified minimum throttle position. Using the modified command range, the throttle command determined by the speed governor 204 is modified, or filtered accordingly.

In an alternative embodiment, the modified throttle command range may be a dynamically determined value. The reduced range may be determined as a function of the magnitude of the speed error, and/or the magnitude of the desired speed. For example, the throttle position command range may be reduced more in response to a large overspeed condition (or large error) than a small overspeed condition, or when a large desired engine speed is requested.

The status of the overspeed condition is continuously monitored to adjust the throttle command range accordingly. That is, the current actual engine speed is determined again and the current desired engine speed is established again. In the preferred embodiment, the modified command range returns to the normal command range as a function of time, speed of the turbo 110, and the speed error.

In the preferred embodiment, the modified range is expanded to the normal range by decreasing the modified minimum commanded throttle position, e.g., from 45% to 0% of the maximum throttle position. The modified minimum throttle position is decreased in response to the current actual engine speed, the current desired engine speed, the speed of the turbo 110, and time. The current actual and desired engine speed are compared to determine the current engine speed error. The manifold pressure is preferably sensed to provide an indication of the speed of the turbo 110. Therefore, as the speed error stabilizes over time, i.e., is reduced to within an acceptable threshold, and the manifold pressure indicates the speed of the turbo 110 is stabilizing, e.g., returning to within an acceptable threshold for the associated desired engine speed, the modified throttle command range will return to the normal, or full throttle command range. For example, if the command range has been reduced to limit the effective throttle position between 45–100% of the throttle position when fully open, the modified command range may gradually expand at a determined rate, e.g., 5% per second. That is, after approximately 9 seconds and a rate of 5% per second, the modified range may return from 45–100% to the full range of 0 to 100%. In the preferred embodiment, the manifold pressure may also be used to vary the rate at which the modified throttle range is changed. For example, as the manifold pressure drops below an established value, the rate at which the modified throttle command range returns to the full range, is increased. When the engine speed error and manifold pressure have returned to an acceptable value, then the throttle command range will be the same as the full throttle command range.

In an alternative embodiment, the modified throttle command range may gradually be returned to the normal, or full range, as a function of time. That is, after the overspeed condition is detected, and the full throttle range is modified to a reduced throttle range. The reduced range is then gradually expanded back to the full range as a function of time.

Alternative combinations including one or more of time, engine speed error, manifold pressure, or speed of the turbo 110, may be used to adjust the throttle command range.

In the fuel control system 100, the controller 102 also controls the quantity of fuel flowing to the turbo 110. The controller 102 determines a fuel command, and delivers the command to the fuel control valve 126. The fuel command controls the amount of fuel to be delivered to the turbo 110, thereby controlling the ratio of air to fuel in the mixture which is delivered to the manifold 118. In the preferred embodiment, a fuel command is determined by a functional fuel governor 208, illustrated in FIG. 2, and the fuel command is then modified in response to the overspeed condition, as illustrated in FIG. 2. In one embodiment, a fuel command modifier is combined with the fuel command. FIG. 4 illustrates one embodiment of a method of modifying the fuel command in response to the overspeed condition. In a first control block 402, the engine speed error is determined in response to the desired and actual engine speed. In a second control block 404 the engine speed error is filtered, such that, when the desired engine speed is less than the actual engine speed, the filter 210 will essentially pass the error, and block the error when the desired engine speed is greater than the actual. Therefore, in the preferred embodiment, the fuel command will be modified in response to the overspeed condition when the desired speed is less than the actual speed.

In a third control block 406, the filtered error is modified by a gain constant, e.g., the error is multiplied by the constant. The proportional gain constant may be determined by empirical testing, and will vary for different fuel systems. In a fourth control block 408, the modified filtered error is then passed through a second filter 212 to limit the value.

In a fifth control block 410 the fuel command modifier may be determined by combining the limited, modified filtered error, with a second modified speed error. The second modified speed error is a result of modifying the error using a transfer equation such as:

$$\frac{K \cdot S}{(S+a)}$$

Where:
K=a constant
S=a Laplace Transform Variable
a=frequency

The resulting modified speed error is combined with the limited, modified, filtered error, to determine a fuel command modifier.

In a sixth control block 412, the combined modified speed error, or fuel command modifier is used to modify the fuel command. The fuel command that is to be modified, is determined by the controller 102 to control the amount of fuel that is mixed with the air in the turbo 110. In one embodiment, the fuel command is determined in response to the inlet manifold pressure, manifold temperature, and actual engine speed. The fuel command may be determined by first determining the amount of air flow into the manifold 118. The air flow may be determined based upon the actual engine speed, inlet manifold pressure, and manifold temperature. Determining air flow based upon engine speed, inlet manifold pressure and temperature, is well known in the art. The air flow is then divided by the appropriate air/fuel ratio to determine the fuel command. The appropriate air/fuel ratio may be determined using an air/fuel ratio map, as is well known in the art. The actual engine speed and the manifold pressure are used as inputs to the air/fuel ratio map to determine the appropriate air/fuel ratio. The air/fuel ratio map is created based upon empirical testing, simulation, and analysis to determine the appropriate air/fuel ratio for a given engine speed and inlet manifold pressure.

Therefore, the amount of air flow into the intake manifold 118 is used in conjunction with an air/fuel ratio map, to determine the amount of fuel needed to be mixed with the air. The amount of fuel needed to be mixed with the air is used to determine the fuel command. In the preferred embodiment the fuel command is determined by dividing the air flow by the air/fuel ratio.

The fuel command is then modified by the fuel command modifier. In the preferred embodiment, the resulting modified fuel command is less than the fuel command prior to modification.

The resulting modified fuel command accounts for an engine overspeed condition. In a seventh control block 414, the modified fuel command is delivered to the fuel valve actuator 126. The fuel valve actuator 126 then responsively controls the position of the fuel control valve 104 to enable the appropriate amount of fuel to be mixed with air for delivery to the manifold 118.

Industrial Applicability

The present invention provides a method and apparatus for controlling the speed of an engine. In the preferred embodiment, the engine has an associated turbo charger and a throttle. The method includes the steps of determining an actual speed of the engine, establishing a desired speed of the engine, determining a status of an overspeed condition in response to said desired speed and said actual speed, and determining a throttle command in response to the desired and actual engine speed, and the overspeed condition status.

When a load is quickly removed from the engine, the desired engine speed is less than the actual engine speed. The fuel control system may attempt to compensate for the load reduction in a manner that results in speed oscillations and poor engine performance. For example, when an overspeed condition occurs, e.g., the desired engine speed is less than the actual engine speed, a fuel control system may attempt to greatly reduce, or close the throttle. However, when this is done the desired speed may soon be much greater than the actual speed. The rapid speed changes due to the significant load changes may lead to overcompensation by the fuel system which may lead to speed instability or oscillations. Therefore, the throttle command range may be reduced. Reducing the throttle command range may help stabilize the engine speed error when, for example, the load is quickly removed. As the engine speed error begins to stabilize over time, the throttle command range is returned to the full range. In the preferred embodiment, the reduced range is returned to normal as a function of time, speed error, and manifold pressure or speed of the turbo 110.

In a preferred embodiment, the fuel command may also be modified in conjunction with the throttle command, in response to the overspeed condition. The fuel command may be reduced in response to the desired engine speed being less than the actual engine speed. The amount the fuel command is modified may be related to the magnitude of the error.

Other aspects, objects, and advantages of the present invention can be obtained from a study of the drawings, the disclosure, and the claims.

What is claimed is:

1. A method for controlling the speed of an engine having a throttle, the throttle having an associated command range, comprising the steps of:

determining an actual speed of the engine;

establishing a desired speed of the engine;

determining a status of an overspeed condition in response to said desired speed and said actual speed;

modifying said throttle command range in response to said overspeed condition; and determining a throttle command in response to said desired speed, said actual speed and said overspeed condition.

2. A method, as set forth in claim 1, wherein the step of modifying said throttle command range includes the step of determining a reduced throttle command range in response to said overspeed condition.

3. A method, as set forth in claim 2, wherein the step of determining said reduced throttle command range includes the step of increasing an initial minimum throttle position command to a modified minimum throttle position command.

4. A method, as set forth in claim 3, including the steps of:
   monitoring said status of said overspeed condition; and
   expanding said modified throttle command range in response to said overspeed condition.

5. A method, as set forth in claim 4, wherein the step of expanding said modified throttle command range includes the step of decreasing said modified minimum throttle position in response to said second actual speed and said second desired engine speed.

6. A method, as set forth in claim 5, wherein the engine includes an associated turbo compressor, including the steps of:

determining an indication of a speed of the turbo; and decreasing said modified minimum throttle position in response to said second actual speed, second desired speed, and said turbo speed indication.

7. A method, as set forth in claim 6, wherein the step of determining an indication of a speed of the turbo includes the step of determining a manifold pressure.

8. A method, as set forth in claim 3, including the steps of:
   determining a second actual engine speed;
   determining a second desired engine speed;
   reducing said modified minimum command range in response to said second actual and said second desired engine speed; and
   wherein said throttle command is determined in response to said second actual speed, second desired speed, and said modified throttle command range.

9. A method, as set forth in claim 8, including the steps of:
   determining an indication of a speed of the turbo; and
   decreasing said modified minimum throttle position in response to said actual speed, desired speed, and said turbo speed indication.

10. A method, as set forth in claim 9, wherein the step of determining an indication of a speed of the turbo includes the step of determining a manifold pressure.

11. A method for controlling the speed of an engine having a throttle, comprising the steps of:
    determining an actual speed of the engine;
    establishing a desired speed of the engine;
    determining a status of an overspeed condition in response to said desired speed and said actual speed;
    determining a throttle command in response to said desired speed, said actual speed and said overspeed condition; and
    decreasing a fuel command in response to said overspeed condition.

12. An apparatus adapted to control the speed of an engine having a throttle, the throttle having an associated command range, comprising:
    a speed sensor adapted to sense an actual speed of the engine and responsively generate an actual speed signal;
    a controller adapted to receive said actual speed signal, establish a desired speed, determine a status of an overspeed condition in response to said desired speed and said actual speed, modify said throttle command range in response to said overspeed condition, and determine a throttle command in response to said desired speed, said actual speed and said overspeed condition.

13. An apparatus, as set forth in claim 12, wherein the controller modifies the throttle command range by determining a reduced throttle command range in response to said overspeed condition.

14. An apparatus, as set forth in claim 13, wherein the controller determines said reduced throttle command range by increasing an initial minimum throttle position command to a modified minimum throttle position command.

15. A method, as set forth in claim 14, wherein the controller is further adapted to monitor said status of said overspeed condition and expand said modified throttle command range in response to said overspeed condition.

16. A method, as set forth in claim 15, wherein the engine further includes an associated turbo compressor, and wherein the controller is further adapted to determine an indication of a speed of said turbo and decrease said modified minimum throttle position in response to said actual speed, said desired speed, and said turbo speed indication.

17. An apparatus, as set forth in claim 16, wherein the engine includes an associated manifold, further including:

a sensor adapted to sense a parameter indicative of a speed of said turbo, and responsively generate a indicative speed signal;

wherein said controller is adapted to receive said indicative speed signal, responsively determine a speed of said turbo, and decrease said modified minimum throttle position in response to said actual speed, desired speed, and said turbo speed.

18. An apparatus, as set forth in claim 17, wherein said sensor is a manifold pressure sensor adapted to sense a pressure of the manifold and responsively generate a manifold pressure signal.

19. An apparatus adapted to control the speed of an engine having a throttle, comprising:

a speed sensor adapted to sense an actual speed of the engine and responsively generate an actual speed signal;

a controller adapted to receive said actual speed signal, establish a desired speed, determine a status of an overspeed condition in response to said desired speed and said actual speed, decrease a fuel command in response to said overspeed condition, and determine a throttle command in response to said desired speed, said actual speed and said overspeed condition.

* * * * *